Figure 1:
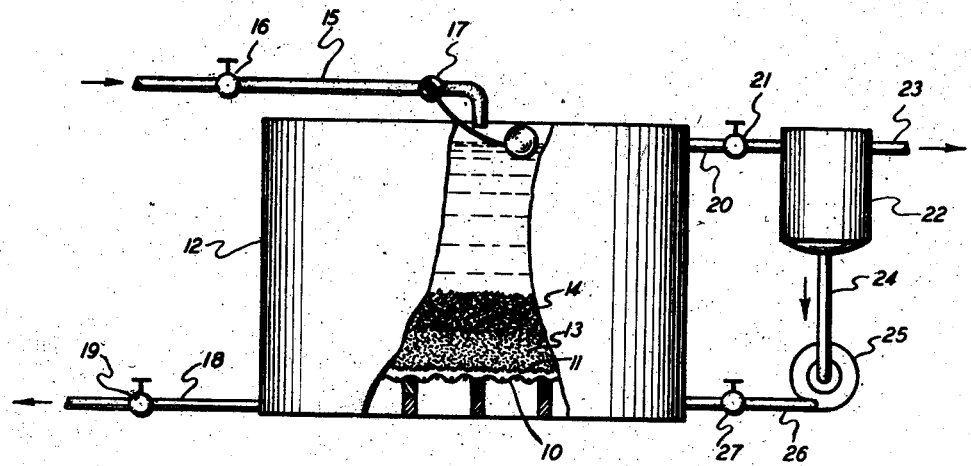

Sept. 3, 1946.  H. SCHILLER ET AL  2,407,180
METHOD OF PURIFYING OIL FIELD WATERS
Filed Oct. 30, 1943

HAROLD SCHILLER
ABRAHAM SHAPIRO
INVENTORS

ATTORNEY

Patented Sept. 3, 1946

2,407,180

UNITED STATES PATENT OFFICE 2,407,180

METHOD OF PURIFYING OIL FIELD WATERS

Harold Schiller, Los Angeles, and Abraham Shapiro, Monrovia, Calif., assignors to Socony-Vacuum Oil Company, Incorporated, New York, N. Y., a corporation of New York Application October 30, 1943, Serial No. 508,360

2 Claims. (Cl. 210—2)

In the production of crude petroleum, and particularly in fields which have been in operation for a considerable time, it is often or usually the case that large proportions of water are brought to the surface with the oil. This water production may in the aggregate be very large, even on a single lease, running into thousands of barrels per day. Under certain circumstances the disposal of these large volumes of water becomes a serious problem by reason of the presence in the water of relatively minute amounts of suspended and very finely divided oil.

If conditions permit the return of the water to porous underground formations, the problem may be avoided. If the condition of the suspended oil be such that it rapidly separates and comes to the surface, it may be removed by settling and skimming, permitting the oil-free water to run to waste. But in cases where the oil refuses to separate, or separates only very slowly (often requiring as much as a month to clarify by gravity) other methods must be applied.

For handling waters of this type attempts have been made to utilize sand filters, gravel or excelsior packs, and similar mechanical methods. These systems, using materials which are preferentially water-wettable, have little or no ability to separate finely dispersed petroleum and are wholly ineffective for our purpose.

Another method in common use is to add an iron or other salt which forms a heavy precipitate and carries the oil particles to the bottom of the water body. This method is handicapped by the cost of the chemicals used and by the production of a viscid oily sludge which in turn is difficult of disposal.

We have discovered that in at least many instances in which gravity separation is unduly slow, the suspended particle consists neither of clean oil nor (as has often been assumed) of a water-in-oil emulsion, but rather of a clay particle saturated and/or coated with oil. We have also discovered that by utilizing the well-known principle of selective adsorption it is possible to separate the oil from the clay particle, retaining the oil on or in the adsorbent mass and permitting the clay to pass through the mass as a harmless suspensoid in a substantially oil-free water which may be utilized or run to waste provided its salinity is not excessive.

In putting this discovery into practice we pass the oily water through a bed (preferably stratified as will later be described) of granules of a solid having a marked preferential wettability for oil. Several such bodies have been described, including the heavy metal sulfides, certain magnesian minerals, cannel coal, and the phenol-formaldehyde synthetic resins, but by reason of its low cost and high efficiency we prefer to use iron sulfid or some inert solid body on which a coating of iron sulfid has been produced.

When water containing finely divided, oil-saturated silt is passed through a bed of such preferentially oil-wetted material, the suspended particles first adhere to the surfaces of the solid grains and clear water flows from the exit side of the bed. So far the behavior of the bed is analogous to that of a sand filter, the suspended particles being entrained and retained. But the bed of sulfid has a second function unlike that of a simple filter. As the entrapped particles remain in contact with the sulfid grains, the saturating oil is withdrawn from the silt or clay (which itself is preferentially water-wettable) and spreads out on the surface of the sulfid grain as a film of clean oil, while the oil-freed silt particle is taken into the water flow and discharged from the bed.

Ordinarily the small proportion of oil-free silt, which may be as much as 200 or 300 parts per million, is wholly innocuous in the vent water and may be wasted. If it should be objectionable, it may be settled out, the silt subsiding rapidly to form a layer of light colored, substantially oil-free mud.

The effect of this segregation of the silt+oil particle into its constituents is not only to reduce the volume of material finally retained in the bed by continuously passing one of the constituents back to the outflowing water, but also to bring the retained constituent (the oil) into that form—a coating on the sulfid grain—in which it has the minimum tendency to fill the interspaces. For these reasons the sulfid bed will continue to discharge oil-free water at any given rate for a commercially practicable length of time.

After the sulfid bed has been in use for a relatively extended period, the oil films surrounding the sulfid grains grow to such thickness as to begin to obstruct the flow of water through the bed. When this occurs, it often suffices to reduce the flow rate for a short period of time, the accumulated oil rising to the surface of the water body over the bed, from which it may be removed by skimming.

If the oil be heavy and viscous, the bed may retain the oil until its capacity is reduced below the required limit and thus need to be cleaned. This may be accomplished by simple backwashing with clear water, only a small quantity being required, preferably at an accelerated flow rate below that at which the grain arrangement of the bed might be disturbed. Backwashing may also be practiced in lieu of allowing lighter oil to pass through the bed and skimming the water if desired.

The time required for backwashing is brief in any case but may be reduced by using hot water and/or by adding to the wash water a surface tension reducing agent such as sodium sulfonate. It is neither necessary nor desirable to remove the oil films completely from the grain.

While it is not essential to the conduct of the process, we find that the functional period of any given bed may be extended by arranging it in at least two layers of different grain size, the coarser layer being on the side at which the contaminated water enters. Two arrangements of such beds are illustrated in the diagrams of the attached drawing, in which Fig. 1 shows an arrangement for downflow by gravity and Fig. 2 an arrangement adapted for upflow under pressure.

Referring first to Fig. 1, a coarse mesh wire screen 10 and a fine mesh screen 11 are supported in any convenient manner clear of the bottom of an open top tank 12. On top of the fine screen rests a bed 13 of any preferred thickness of crushed and screened iron sulfid (FeS) of relatively small particle size, as for example through a 20 mesh and retained on a 40 mesh screen, or, for very refractory waters, through 40 and on 60 mesh. On this bed rests a second bed 14 of materially larger particle size, as for example of the range 8 to 12 mesh, and if desired a third layer of even coarser grain may be used.

Contaminated water flows into the tank through a feed pipe 15 having a stop valve 16 and a float controlled valve 17. Oil-free water drains from the tank through a pipe 18 having a stop valve 19.

An overflow pipe 20 having a stop valve 21 leads to a backwash separator 22 having an overflow 23 for separated oil. From the bottom of the separator a pipe 24 leads to a circulating pump 25 which discharges separated water through pipe 26 and valve 27 into the bottom of the tank. By this means a small quantity of water circulated through the bed suffices for a backwash of any length and no outside source of clear water supply is required. The oil overflowing from the separator will usually carry some water, which will settle out in a reasonable time.

Figure 2:
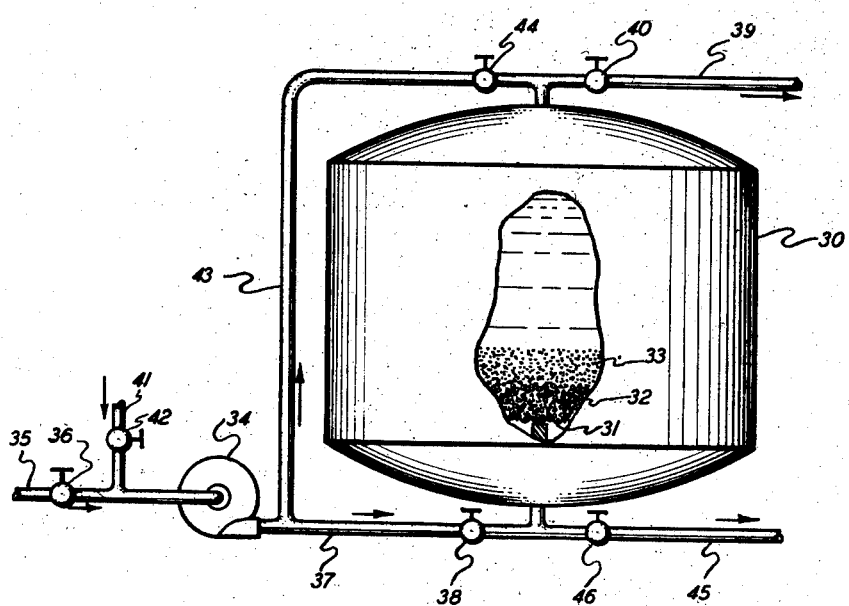

Referring to Fig. 2, a closed tank 30 is provided internally with a coarse screen 31 on which rests a bed 32 of coarse mesh sulfid which in turn supports a bed 33 of finer mesh. A pump 34 draws oily water through a pipe 35 and valve 36 and discharges it through pipe 37 and valve 38 into the bottom of the bed to flow upwardly. Clean water is discharged from the top of the tank through pipe 39 and valve 40.

For backwashing, the pump draws clean water through pipe 41 and valve 42 and discharges it into the top of the tank through pipe 43 and valve 44, the backwash liquids being discharged from the bottom of the tank through pipe 45 and valve 46 to any point of separation of oil and water, as for example to one of the tanks receiving oil directly from one or more wells.

The effectiveness of the general method of separating suspended oil from water above described is illustrated by the following example taken from actual practice at a group of heavy oil wells in Kern County, California. These wells produce about 25,000 barrels of water per day; the water after separation from the oil by gravity contains about 500 parts per million of a fine suspensoid consisting in part of silt particles saturated or coated with oil. The proportions of silt to oil in these particles is such that they have almost the same specific gravity as the water so that they come to the surface very slowly on standing, a month or more being required for clarification in that manner.

A test bed of iron sulfid was established having a 5″ layer of 8/20 mesh on its intake side and a 3″ layer of 20/40 mesh on its outlet side. The above described water was flowed through this bed at velocities approximating 70 lineal feet per hour and the beds backwashed about every 24 hours. The following operating data were taken:

| Operation | Velocity | Period | Suspensoids, P. P. M. | |
|---|---|---|---|---|
| | | | Raw water | Effluent |
| | Feet | | | |
| Forward flow | 71.8 | Initial | 500 | 35 |
| Do | 4.6 | After 27 hrs | 500 | 32 |
| Backwash | 71.0 | 7 minutes | | |
| Forward flow | 65.0 | Initial | 500 | 28 |
| Do | 6.8 | After 24 hrs | 500 | 36 |
| Backwash | 71.0 | 9 minutes | | |
| Forward flow | 73.2 | Initial | 500 | 28 |

This test operation was continued for about three weeks without any measurable change in the length of operative period, time for backwashing or purity of effluent water.

Where iron sulfid is used as the preferentially oil-wettable agent, the surfaces of the grains should be protected from oxidation so far as possible, as by keeping the beds continuously flooded. Oxide coatings on the granules will materially reduce the oil-absorbing capacity of the mass. Such coatings, if accidentally formed, may be removed by flushing with a dilute mineral acid followed by careful washing with water.

We claim as our invention:

1. The method of removing clay-suspended petroleum from oil-field water, which comprises: passing said water by controlled flow through a bed composed of granules of ferrous sulfid (FeS) and thereby transferring said petroleum from said clay suspension to the granules composing said bed; passing substantially oil-free clay particles from said suspension out of said bed into suspension in the effluent water and retaining the petroleum in said bed.

2. The method of removing suspended petroleum from oil-field water in which said petroleum is adsorbed in clay particles, which comprises: passing said water through a bed composed of granules of ferrous sulfid (FeS) and thereby transferring said petroleum from said clay particles to the granules composing said bed; passing substantially oil-free clay particles out of said bed in suspension in the effluent water; so regulating the velocity of water flow through said bed as to cause said petroleum to be retained therein, and periodically removing excess petroleum from said bed by washing with water flowing at a velocity higher than that of said oil field water containing said clay-suspended petroleum.

HAROLD SCHILLER.
ABRAHAM SHAPIRO.